3,562,265
2-METHYLSULFONYL-4,6,8-TRISUBSTITUTED-
[5,4-d]-PYRIMIDINES
Masuo Murakami, Shigemi Kawahara, Sanae Ishida, and Mikio Ohno, Tokyo, and Hiroshi Horiguchi, Tokorozawa-shi, Japan, assignors to Yamanouchi Pharmaceutical Co., Ltd., Tokyo, Japan
No Drawing. Filed Aug. 15, 1967, Ser. No. 660,590
Claims priority, application Japan, Aug. 16, 1966, 41/53,408; Jan. 18, 1967, 42/3,453
Int. Cl. C07d 87/40
U.S. Cl. 260—246          6 Claims

ABSTRACT OF THE DISCLOSURE

Novel substituted 2 - methylsulfonylpyrimido - [5,4-d] pyrimidines of the formula:

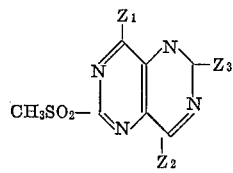

wherein each of $Z_1$ and $Z_2$ is selected from the group consisting of diethanolamino, piperidino and morpholino groups and $Z_3$ is selected from the group consisting of halogen and diethanolamino, piperidino and morpholino groups. The novel pyrimidines have coronary vasodilating activity and attain high blood levels by oral administration.

---

The present invention relates to novel substituted pyrimido-[5,4-d]-pyrimidines and a process for the preparation thereof.

More particularly, the invention relates to novel substituted 2 - lower alkylsulfonyl - pyrimido-[5,4-d]-pyrimidines represented by the general formula

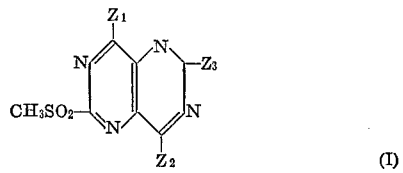

wherein $Z_1$, $Z_2$ and $Z_3$ are selected from the group consisting of diethanolamino, piperidino and morpholino groups, said $Z_3$ may further be a halogen atom. The novel pyrimidines are prepared by using as starting materials novel compounds, 2 - methylsulfonyl-4,6,8-trihalogenopyrimido-[5,4-d]-pyrimidines shown by the general formula

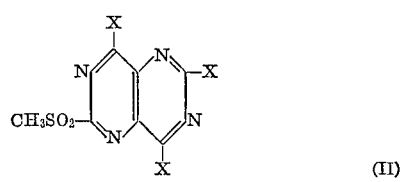

wherein X is a halogen atom.

Furthermore, the instant invention relates also to a process for the preparation of the substitution derivatives.

It has been known that 2,6-bis-(diethanolamino)-4,8-dipiperidinopyrimido - [5,4-d]-pyrimidine and homologs thereof have a remarkable coronary vasodilating action. (Ref. e.g. U.S. Pat. No. 3,031,450, British Pat. No. 807,826).

The substituted pyrimido-[5,4-d]-pyrimidine of this invention has a methylsulfonyl group at the 2-position and shows a coronary vasodilating action as the conventional substituted pyrimido-[5,4-d]-pyrimidine but the substituted pyrimido-[5,4-d]-pyrimidine of the present invention is excellent as compared with the conventional ones since it maintains a high blood level when it is orally administered.

The novel compounds of this invention may be prepared as follows:

In the first place, the compounds of this invention as shown by aforesaid Formula I wherein $Z_3$ is a halogen atom may be prepared by the reacting one mol of a 2 - methylsulfonyl - 4,6,8 - trihalogeno - pyrimido-[5,4-d] pyrimidine and more than 2 mols, preferably more than 4 mols of a compound selected from the group consisting of diethanolamine, piperidine and morpholine, generally, in a solvent such as dioxane and the like at room temperature or under cooling. The compound thus obtained is, for example, 2 - methylsulfonyl-6-chloro-4,8-dipiperidino-pyrimido-[5,4-d]-pyrimidine.

In the second place, the compounds of this invention as shown by Formula I wherein $Z_3$ is not halogen atom may be prepared by reacting one mol of the 6-halogeno compound obtained as above and more than one mole but preferably more than 2 mols of a compound selected from the group consisting of diethanolamine, piperidine and morpholine.

Furthermore, the compounds shown by above general Formula I wherein the substituents at the 4,6 and 8 positions are the same may be prepared directly by the reaction of one mol of the starting material shown by general Formula II, a 2-methylsulfonyl-4,6,8-trihalogenopyrimido-[5,4-d]-pyrimidine and more than 3 mols, preferably, more than 6 mols of a compound selected from the group consisting of diethanolamine, piperidine and morpholine.

In the aforesaid reactions, the amount of the reactant, the compound selected from the group consisting of diethanolamine, piperidine and morpholine may be reduced by adding to the reaction system a tertiary amine such as triethylamine or pyridine as an agent for removing hydrohalogenic acids.

The 2 - methylsulfonyl - 4,6,8 - trihalogenenopyrimido-[5,4-d]-pyrimidine shown by the aforesaid general Formula II used as the starting material in the present invention is also a novel compound and may generally be prepared by, for example, the following method. That is, 2-methylmercapto-4-hydroxypyrimidine-6-carboxylic acid is dispersed in glacial acetic acid and is converted into 2 - methylmercapto - 4 - hydroxy-5-bromopyridine-6-carboxylic acid by the reaction thereof with bromine. The carboxylic acid thus obtained is then heated in an autoclave with the addition of aqueous ammonia and copper powders to be converted into 2 - methylmercapto - 4 - hydroxy-5-aminopyrimidine-6-carboxylic acid, which is further caused to react with urea to provide 2-methylmercapto-4,6,8-trihydroxypyrimido-[5,4-d]-pyrimidine. The pyrimidine thus obtained is oxidized by using an oxidant such as chlorine or potassium permanganate at room temperature or under cooling to form a 2-methylsulfonyl-4,6,8-trihydroxypyrimido-[5,4-d]-pyrimidine, which is then halogenized by a known method using a halogenizing agent such as phosphorus pentachloride, phosphorus oxychloride, phosphorus pentabromide or phosphorus tribromide.

The preparation of the starting materials of this invention will be explained practically and more in detail by the following methods, however, it should be understood that they are only illustrative purposes and the starting materials prepared by other methods may of course be employed.

METHOD 1

Preparation of 2-methylmercapto-4-hydroxy-5-bromopyrimidine-6-carboxylic acid In 1000 ml. of glacial acetic acid was dispersed 50 g. of 2-methylmercapto - 4 - hydroxypyrimidine-6-carboxylic acid and thereafter 12.0 ml. of bromine was added dropwise into the resulting dispersion. The mixed solution thus obtained was heated to 50° C. for 30 minutes while stirring to provide a homogeneous solution. The solution was then allowed to cool with stirring to deposit crystalline precipitates, which were recovered by filtration. The filtrate thus obtained was concentrated under a reduced pressure to provide a crystalline residue. The precipitates and the crystalline residue thus obtained were recrystallized from 100 ml. of glacial acetic acid, whereby 67.0 g. (yield 94%) of the objective compound was obtained. The melting point of the compound was 202–204° C.

Elementary analysis as $C_6H_5N_2O_3SBr$.—Calculated (percent): N, 10.55; Br, 30.15. Found (percent): N, 10.70; Br, 30.11.

METHOD 2

Preparation of 2-methylmercapto-4-hydroxy-5-aminopyrimidine-6-carboxylic acid A mixture of 26.5 g. of 2-methylmercapto-4-hydroxy-5-bromopyrimidine-6-carboxylic acid, 75 ml. of 28% aqueous ammonia and 0.1 g. of copper powders was heated for 3 hours to 90–100° C. in an autoclave. The reaction liquid was concentrated under a reduced pressure, the residue thus obtained was dissolved in diluted hot aqueous ammonia and, after treated with decoloring carbon, was acidified by acetic acid to provide 16.0 g. (yield 80%) of the yellow precipitates of the objective material having a melting point of 247–249° C. (decomposed).

Elementary analysis as $C_6H_7N_3O_3S$.—Calculated (percent): C, 35.82; H, 3.51; N, 20.89. Found (percent): C, 35.50; H, 3.37; N, 20.56.

METHOD 3

Preparation of 2-methylmercapto-4,6,8-trihydroxypyrimido-5,4-d-pyrimidine

A mixture of 3.5 g. (3.6 g. when an ammonium salt is used) of 2 - methylmercapto-4-hydroxy-5-aminopyrimidine-6-carboxylic acid and 9.0 g. of fine powders of urea was melted by heating for 15–20 minutes to 180° C. The melt was allowed to cool to about 70° C. and immersed in 50 ml. of warm methanol to remove soluble components. The insoluble residue was recovered by filtration, dissolved in diluted aqueous ammonia, and, after treated with decoloring carbon, acidified by acetic acid to deposit 3.0 g. (yield 76%) of the yellow precipitates of the objective material having a melting point of higher than 350° C.

Elementary analysis as $C_7H_6N_4O_3S$.—Calculated (percent): C, 37.17; H, 2.67; N, 24.77. Found (percent): C, 36.83; H, 2.89; N, 24.34.

METHOD 4

Preparation of 2-methylsulfonyl-4,6,8-trihydroxypyrimido-[5,4-d]-pyrimidine

In 20 ml. of water were dispersed 11.0 g. of fine powders of 2-methylmercapto - 4,6,8 - trihydroxypyrimido-[5,4-d]-pyrimidine. The dispersion was ice-cooled to a temperature lower than 15° C., and a chlorine gas was introduced into the dispersion while stirring, whereby the fine powders were changed from yellow to white. The product was recovered by filtration and washed with water and then acetone to provide 9.5 g. (yield 75%) of the objective material having a melting point of higher than 350° C.

Elementary analysis as $C_7H_6N_4O_5S$.—Calculated (percent): N, 21.70; S, 12.42. Found (percent): N, 21.65; S, 11.92.

METHOD 5

Preparation of 2-methylsulfonyl-4,6,8-trichloropyrimido-[5,4-d]-pyrimidine

A mixture of 1.5 g. of 2-methylsulfonyl-4,6,8-trihydroxypyrimido-[5,4-d]-pyrimidine and 7.5 g. of phosphorus pentachloride was melted by heating for 30 minutes to 160–170° C. After allowing to cool, the melt was dispersed in 50 ml. of ice water to deposit light-brown precipitates, which were recovered by filtration and washed with water to provide 1.1 g. (yield 60%) of the objective material having a melting point of 227–229° C. When the crystal was recrystallized from acetone, the melting point of it was 232–233° C.

Elementary analysis as $C_7H_3N_4O_2Cl_3S$.—Calculated (percent): N, 17.87; S, 10.23; Cl, 33.92. Found (percent): N, 17.41; S, 9.73; Cl, 33.50.

The present invention will now be described in detail referring to the following examples.

EXAMPLE 1

2-methylsulfonyl-6-chloro-4,8-dipiperidino-pyrimido-[5,4-d]-pyrimidine

Into 30 ml. of dioxane was dissolved 2.4 g. of 2-methylsulfonyl-4,6,8-trichloropyrimido-[5,4-d] - pyrimidine prepared in above-mentioned method 5. Apart from this, 3.1 g. of piperidine was dissolved in 7 ml. of dioxane and the resulting solution was added dropwise to the solution of the pyrimido-[5,4-d]-pyrimidine compound prepared above while stirring under cooling. After the end of the addition, the system was further stirred for 30 minutes at room temperature. Thereafter, the reaction solution was dispersed in 80 ml. of ice water to provide the precipitations of the objective material, which were recovered by filtration. The amount of the product was 2.85 g. (yield 91%). When the product was recrystallized from dioxane, the melting point of the product was 176–178° C.

Elementary analysis as $C_{17}H_{23}N_6O_2ClS$.—Calculated (percent): C, 49.69; H, 5.64; N, 20.45; Cl, 8.64. Found (percent): C, 49.93; H, 5.68; N, 20.49; Cl, 8.59.

EXAMPLE 2

2-methylsulfonyl-6-chloro-4,8-dipiperidino-pyrimido-[5,4-d]-pyrimidine

A mixture of 1,3 g. of 2-methylsulfonyl-4,6,8-trihydroxypyrimido-[5,4-d]-pyrimidine prepared in method 4 and 6.5 g. of the fine powders of phosphorus pentachloride was melted by heating for 30 minutes to 160° C. In this case, phosphorus oxychloride byproduced was distilled out of the reaction system under a reduced pressure. The residue was mixed with 5 ml. of anhydrous dioxane and the soluble component was extracted under cooling. After adding 3.5 g. of piperidine to the extract while cooling, the system was stirred for 30 minutes at room temperature. The product was processed as in Example 1 to provide 1.52 g. (yield 73%) of the objective material.

EXAMPLE 3

2-methylsulfonyl-4,8-dimorpholino-6-chloropyrimido-[5,4-d]-pyrimidine

Into 30 ml. of dioxane was dissolved 2.4 g. of 2-methylsulfonyl-4,6,8-trichloropyrimido-[5,4-d] - pyrimidine prepared in method 5. Apart from this, 3.1 g. of morpholine was dissolved into 7 ml. of dioxane and the resulting solution was added dropwise into the solution of the pyrimido-[5,4-d]-pyrimidine compound prepared above with stirring under cooling.

After the end of the addition, the system was stirred further for 30 minutes at room temperature. Thereafter, the reaction liquid was dispersed in 80 ml. of ice water to deposit the objective material, which was recovered by filtration. The amount of the product was 2.0 g. (yield 63%) and the melting point thereof was 193–195° C.

Elementary analysis as $C_{15}H_{19}N_6O_4ClS$.—Calculated (percent): C, 43.42; H, 4.62; N, 20.26; S, 7.73; Cl, 8.55. Found (percent): C, 43.16; H, 4.41; N, 19.98; S, 7.40; Cl, 9.01.

EXAMPLE 4

2-methylsulfonyl-4,8-dimorpholino-6-diethanol-aminopyrimido-[5,4-d]-pyrimidine

A mixture of 4.1 g. of 2-methylsulfonyl-4,8-dimorpholino-6-chloropyrimido-[5,4-d]-pyrimidine and 32 g. of diethanolamino was heated to 150° C. while shaking for 30 minutes. The reaction mixture was mixed with about 50 ml. of water followed by shaking and then the mixture was allowed to stand for one night, whereby the crude light-brown crystals of the objective material were precipitated, which was recovered by filtration and washed five times with 4 ml. of ether to provide 2.9 g. (yield 60%) of the yellow crystals of the objective material having a melting point of 186–188° C.

Elementary analysis as $C_{19}H_{29}N_7O_6S$.—Calculated (percent): C, 47.19; H, 6.05; N, 20.28; S, 6.63. Found (percent): C, 47.04; H, 6.05; N, 20.34; S, 6.48.

EXAMPLE 5

2-methylsulfonyl-4,8-bisdiethanolamino-6-chloro-pyrimido-[5,4-d]-pyrimidine

Into 30 ml. of dioxane was dissolved 2.4 g. of 2-methylsulfonyl - 4,6,8 - trichloropyrimido - [5,4-d] - pyrimidine. Apart from this, 3.3 g. of diethanolamine was dissolved into 7 ml. of dioxane and the resulting solution was, under cooling, added dropwise with stirring into the solution of the pyrimido-[5,4-d]-pyrimidine compound prepared above.

After the end of the addition, the system was stirred further for 30 minutes at room temperature. Thereafter, the oily precipitates of by-produced diethanolamine hydrochloride were separated from the reaction system by decantation and the precipitates were washed with a small amount of dioxane to recover the effective component attached to the precipitates. The washing solution was mixed with the liquid component obtained by the above decantation, the mixed solution was concentrated and the concentrated residue was recrystallized from ethyl acetate to provide 1.6 g. (yield 46.6%) of the objective material having a melting point of 168–170° C.

Elementary analysis as $C_{15}H_{23}N_6O_6ClS$.—Calculated (percent): C, 39.95; H, 5.14; N,18.64; Cl, 7.86; Found (percent): C, 40.12; H, 5.24; N, 18.38; Cl, 7.58.

EXAMPLE 6

2-methylsulfonyl-4,6,8-trisdiethanolamino-pyrimido-[5,4-d]-pyrimidine

A mixture of 2.4 g. of 2-methylsulfonyl-4,6,8-trichloro-pyrimido-[5,4-d]-pyrimidine, 4.8 g. of diethanolamine, and 40 ml. of dioxane was heated for 30 minutes at 150° C. in a closed tube.

After the end of the reaction, the by-produced oily precipitates of diethanolamine hydrochloride was separated by decantation as in Example 5 and the precipitates thus separated were washed with a small amount of dioxane to recover effective components from the precipitates. The washing solution was mixed with the liquid component obtained by the aforesaid decantation and the mixture was concentrated. The concentrated residue was recrystallized from acetone to provide 2.0 g. (yield 50%) of the objective material having a melting point of 163–165° C.

Elementary analysis as $C_{19}H_{33}N_7O_8S$.—Calculated (percent): C, 43.92; H, 6.45; N, 18.87. Found (percent): C, 43.81; H, 6.18; N, 18.63.

EXAMPLE 7

2-methylsulfonyl-6-diethanolamino-4,8-dipiperidinopydimido-[5,4-d]-pyrimidine

A mixture of 4.1 g. of 2-methylsulfonyl-6-chloro-4,8-dipiperidinopyrimido-[5,4-d]-pyrimidine and 32 g. of diethanolamine was heated for 30 minutes to 150° C. with shaking. The reaction mixture was mixed with 50 ml. of water followed by shaking and the system was allowed to stand for one night to provide the crude yellowish brown precipitates of the objective material. The precipitates were recovered by filtration and washed five times with 4 ml. of ether to provide 2.8 g. (yield 60%) of the yellow crystals of the objective material having a melting point of 138–141° C.

Elementary analysis as $C_{21}H_{33}N_7O_4S$.—Calculated (percent): N, 20.44; S, 6.69. Found (percent): N, 20.49; S, 6.28.

EXAMPLE 8

2-methylsulfonyl-6-morpholino-4,8-dipiperidino-pyrimido-[5,4-d]-pyrimidine

A mixture of 4.1 g. of 2-methylsulfonyl-6-chloro-4,8-dipiperidinopyrimido-[5,4-d[-pyrimidine and 30 ml. of morpholine was heated under refluxing for 30 minutes with shaking, whereby the reaction mixture became reddish brown. When the reaction system was dispersed in 150 ml. of water, the objective material was precipitated as yellow crystals. The system was allowed to stand for one night to complete the deposition of the crystals, which were recovered by filtration. The amount of the crystals recovered was 3.9 g. (yield 85%). The crystals were recrystallized from methanol to provide the yellow fine needles having a melting point of 186–188° C.

Elementary analysis as $C_{21}H_{31}N_7O_3S$.—Calculated (percent): C, 54.64; H, 6.77; N, 21.24. Found (percent): C, 54.80; H, 6.69; N, 21.32.

EXAMPLE 9

2-methylsulfonyl-4,6,8-tripiperidinopyrimido-[5,4-d]-pyrimidine

A mixture of 4.1 g. of 2-methylsulfonyl-6-chloro-4,8-dipiperidinopyrimido-[5,4-d]-pyrimidine and 30 ml. of piperidine was heated under refluxing for 30 minutes while shaking, whereby the reaction liquid became red and the needles of piperidine hydrochloride were deposited. When the reaction system containing the by-produced crystals of the piperidine hydrochloride was dispersed in about 150 ml. of water, the system was once emulsified but crude crystals of the objective material were soon deposited (in this case, the crystals of the piperidine hydrochloride were dissolved in the solution). The system was allowed to stand for one night to complete the precipitation. The crystals were recovered by filtration to provide 4.2 g. (yield 91%) of the objective product, which was recrystallized from ethanol to provide yellow fine needles having a melting point of 124–125° C.

Elementary analysis as $C_{22}H_{33}N_7O_2S$.—Caluculated (percent): C, 57.49; H, 7.24; N, 21.33. Found (percent): C, 57.67; H, 7.23; N, 21.37.

When the product was melted together with the product directly obtained from 2-methylsulfonyl-4,6,8-trichloro-pyrimido-[5.4-d]-pyrimidine and piperidine by similar reaction procedure, no melting point reduction was shown.

The pharmacological actions of 2-methylsulfonyl-6-diethanolamino - 4,8 - dipiperidinopyrimido - [5,4-d]-pyrimidine, one of the compounds of this invention (I), and 2,6-bis-(diethanolamino)-4,8-dipiperidinopyrimido-[5,4-d]-pyrimidine (dipyridomole, Persantin; (II)) one of the well known coronary vasodilating drugs, were studied.

The results obtained, as mentioned below, reveal that the compound (I) causes a potent and remarkably long-lasting coronary vasodilation as well as a marked increase of the oxygen supply to the heart without exciting its oxygen consumption.

When administered orally, the high blood level of the compound (I) was maintained for a longer period than in the case of using other ordinary vasodilators such as compound (II).

coronary outflow was measured with the electromagnetic flowmeter. The oxygen content of blood samples from coronary sinus and femoral artery was measured by the method of Van Slyke. The systemic blood pressure which was taken from the femoral artery by means of the electric transducer, the electrocardiogram (Lead I) and the coronary outflow were recorded simultaneously with the multipurpose polygraph RM-150 (Nihon Kohden).

The test substances were dissolved in 50% propyrene-glycol and injected into the femoral vein (1.5 mg./kg.).

Table 2 shows the mean values from five animals before and three minutes after the drug injections.

TABLE 2

| Drug | Blood pressure, mm. Hg | Coronary blood outflow, ml./100 g./min. | Arterio-venous oxygen difference, vol. percent | $O_2$-consumption of heart, ml./100 g./min. | Heart rate, c.p.m. |
|---|---|---|---|---|---|
| Compound I of this invention: [1] | | | | | |
| Before | 75.2 | 45.4 | 10.89 | 3.91 | 147.0 |
| After | 52.0 | 84.4 | 5.45 | 3.75 | 136.0 |
| Change, percent ± S.E. | 71.0±9.6 | 202.3±19.9 | 48.6±6.5 | 90.4±16.4 | 93.2±1.9 |
| Compound II of this invention: [2] | | | | | |
| Before | 71.2 | 36.7 | 12.84 | 4.05 | 123.8 |
| After | 46.8 | 65.8 | 5.93 | 2.81 | 95.0 |
| Change, percent ± S.E. | 66.1±7.8 | 181.4±13.5 | 43.0±9.5 | 74.9±14.6 | 75.7±11.3 |

[1] 2-methyl-sulfonyl-6-diethanolamino-4,8-dipiperidino-pyrimido-[5,4-d]-pyrimidine.
[2] 2,6-bis-(diethanolamino)-4,8-dipiperidino-pyrimido-[5,4-d]-pyrimidine.

EXPERIMENT 1

Measurement of coronary blood inflow by the method of Eckenhoff

Dogs weighing 10–20 kg. were anesthetized with pentobarbital sodium (30 mg./kg., i.v.), and, the chest opened put under artificial respiration. The left anterior descending coronary artery or the circumflex coronary artery was cannulated and perfused with the blood from carotid artery, and the coronary inflow was measured with an electromagnetic flowmeter (J. E. Eckenhoff: Am. J. Physiol., 148, 582 (1947). The systemic blood pressure and the coronary inflow were recorded simultaneously with the multipurpose polygraph RM-150 (Nihon Kohden).

Drugs were dissolved in 0.5 ml. of 50% ethanol and injected into the cephalic vein. The results are shown in Table 1.

$$\text{Change (percent)} = \Sigma \frac{\text{After}}{\text{Before}} \times 100/\text{Number of Animals}$$

EXPERIMENT 3

Blood levels of drugs after oral administration in rats

Female Wistar rats weighing 160–200 g. were used. Each group of five animals received the compounds (50 mg./kg.) orally, and half an hour to eight hours later the animals were sacrificed under ether anesthesia. The blood sample from the carotid artery was centrifuged and 0.1 ml. of the serum obtained was diluted 100 times with an aqueous solution of sodium carbonate (pH 10.5) for the fluorometry.

TABLE 1

| Drug | Dose, mg./kg. | Dog No., weight and sex | Coronary blood inflow | | | Blood Pressure | | |
|---|---|---|---|---|---|---|---|---|
| | | | Before, ml./sec. | Maximal increase, percent | Duration, min. | Before, mm. Hg | Change, mm. Hg | |
| | | | | | | | Maximal change | 15 min. after |
| Compound I of this invention [1] | 0.5 | #1(13 kg.) ♂ | 0.40 | 238 | 16 | 140 | −5 | 0 |
| | | #2(20 kg.) ♂ | 0.52 | 145 | 50 | 105 | 0 | 0 |
| | 1.0 | #3(17 kg.) ♀ | 0.42 | 180 | 60 | 90 | −5 | 0 |
| | | #4(10 kg.) ♂ | 0.14 | 314 | 10 | 100 | −10 | −10 |
| Compound II of this invention [2] | 0.5 | #1(13 kg.) ♂ | 0.30 | 227 | 10 | 130 | −10 | −10 |
| | | #2(20 kg.) ♂ | 0.72 | 139 | 30 | 90 | −5 | −5 |
| | 1.0 | #3(17 kg.) ♀ | 0.54 | 244 | 60 | 105 | −10 | −5 |
| | | #4(10 kg.) ♂ | 0.10 | 310 | 12 | 92 | −5 | −5 |

[1] 2-methyl-sulfonyl-6-diethanol-amino-4,8-dipiperidino pyrimido-[5,4-d]-pyrimidine.
[2] 2,6-bis-(diethanol-amino)-4,8-dipiperidino-pyrimido-[5,4-d]-pyrimidine.

EXPERIMENT 2

Measurements of coronary blood outflow, cardiac oxygen supply and other cardiovascular parameters by the method of Morawitz The open chest dogs weighing 7–9 kg. which were anesthetized with pentobarbital sodium (30 mg./kg., i.v.) were used. The coronary sinus was cannulated according to the method described in the reference (P. Morawitz: Dtsch. Arch. Klin. Med. 116, 364 (1914)), and the The drug concentration in serum was determined fluorometrically (T. J. Mellinger and J. G. Bohorfoush: Arch. Int. Pharmacodyn., 156 (2), 380 (1965)) by means of the fluorometer PPL-2 (Hitachi). Readings for quantitative analysis of the drugs were taken at 470 m. excitation at 365 m.

Table 3 shows the mean values of concentration ($\mu$g./ml. serum) of the compounds (I) and (II) together with standard errors.

TABLE 3

| Drug | Hours | | | | | |
|---|---|---|---|---|---|---|
| | 0.5 | 1 | 2 | 3 | 5 | 8 |
| Compound I of this invention [1] | 1.02 ±0.70 | 3.97 ±0.78 | 3.40 ±0.45 | 3.00 ±1.19 | 3.87 ±0.65 | 3.08 ±0.52 |
| Compound II of this invention [2] | 4.43 ±2.06 | 3.01 ±0.93 | 0.44 ±0.20 | 0.58 ±0.42 | 0.45 ±0.11 | 0.41 ±0.09 |

[1] 2-methylsulfonyl-6-diethanolamino-4,8-dipiperidino-pyrimido-[5,4-d]-pyrimidine.
[2] 2,6-bis-(diethanolamino)-4,8-dipiperidino-pyrimido-[5,4-d]-pyrimidine.

What is claimed is:
1. A compound of the formula

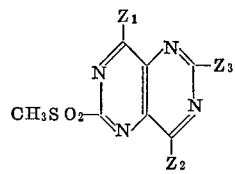

wherein each of $Z_1$ and $Z_2$ is selected from the group consisting of diethanolamino, piperidino and morpholino groups and $Z_3$ is selected from the group consisting of halogen and diethanolamino, piperidino and morpholino groups.

2. 2-methylsulfonyl - 6 - chloro - 4,8 - dipiperidino-pyrimido-[5,4-d]-pyrimidine.

3. 2-methylsulfonyl - 4,8 - dimorpholino - 6 - diethanolaminopyrimido-[5,4-d]pyrimidine.

4. 2 - methylsulfonyl - 4,6,8 - tris(diethanolamino)-pyrimido-[5,4-d]-pyrimidine.

5. 2-methylsulfonyl - 6 - diethanolamino - 4,8 - dipiperidinopyrimido-[5,4-d]-pyrimidine.

6. 2-methylsulfonyl - 6 - morpholino-4,8-dipiperidino-idino-[5,4-d]-pyrimidine.

No references cited.

NICHOLAS S. RIZZO, Primary Examiner

J. TOVAR, Assistant Examiner

U.S. Cl. X.R.

260—247.1, 256.5; 424—248, 251